(12) United States Patent
Sugiyama et al.

(10) Patent No.: US 11,595,139 B2
(45) Date of Patent: Feb. 28, 2023

(54) DEVICE AND METHOD FOR ESTIMATING COMMUNICATION QUALITY

(71) Applicant: FUJITSU LIMITED, Kawasaki (JP)

(72) Inventors: Junichi Sugiyama, Kawasaki (JP); Yuji Ikegami, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 17/489,845

(22) Filed: Sep. 30, 2021

(65) Prior Publication Data
US 2022/0231771 A1    Jul. 21, 2022

(30) Foreign Application Priority Data

Jan. 15, 2021 (JP) .............................. JP2021-004594

(51) Int. Cl.
*H04B 17/309* (2015.01)
*H04L 25/03* (2006.01)
*H04L 1/00* (2006.01)
*H04L 1/20* (2006.01)

(52) U.S. Cl.
CPC ......... *H04B 17/309* (2015.01); *H04L 1/0061* (2013.01); *H04L 1/203* (2013.01); *H04L 25/03* (2013.01); *H04L 25/03885* (2013.01)

(58) Field of Classification Search
CPC ..... H04B 17/309; H04L 1/004; H04L 1/0045; H04L 1/0061; H04L 25/0202; H04L 25/03; H04L 1/203; H04L 1/206; H04L 25/4917; H04L 25/03146; H04L 25/03885
See application file for complete search history.

(56) References Cited

U.S. PATENT DOCUMENTS

| | | | |
|---|---|---|---|
| 6,268,767 B1* | 7/2001 | Maalej | H04L 27/3872 375/345 |
| 8,151,165 B2* | 4/2012 | Belogolovy | H04L 1/0045 714/762 |
| 10,135,645 B1* | 11/2018 | Mazzini | H04L 1/004 |
| 2007/0168835 A1* | 7/2007 | Amrutur | H04L 25/03866 714/758 |
| 2012/0002961 A1 | 1/2012 | de Lind van Wijngaarden | |

FOREIGN PATENT DOCUMENTS

JP    2012-529847 A    11/2012
WO    2019/167275 A1    9/2019

\* cited by examiner

*Primary Examiner* — Betsy Deppe
(74) *Attorney, Agent, or Firm* — Fujitsu Patent Center

(57) ABSTRACT

A communication quality estimating device estimates an error rate of a signal with FEC capable of correcting K errors. The device obtains a frequency measurement value that indicates a frequency at which a codeword including m errors is received. The device determines a transition probability and a continuation probability included in each of a plurality of formulae, such that a frequency calculation value that is calculated using the plurality of formulae and indicates a frequency at which a codeword including m errors is received is brought close to the frequency measurement value. The device calculates a frequency at which a codeword including more than K errors is received, by using the plurality of formulae each with the determined transition probability and the determined continuation probability. The device estimates after-FEC error rate based on a result of the calculation.

8 Claims, 15 Drawing Sheets

F I G. 4 A
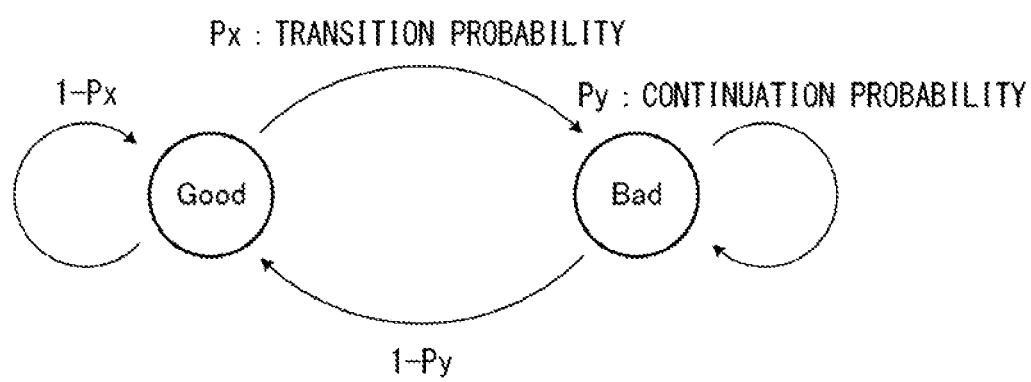
F I G. 4 B
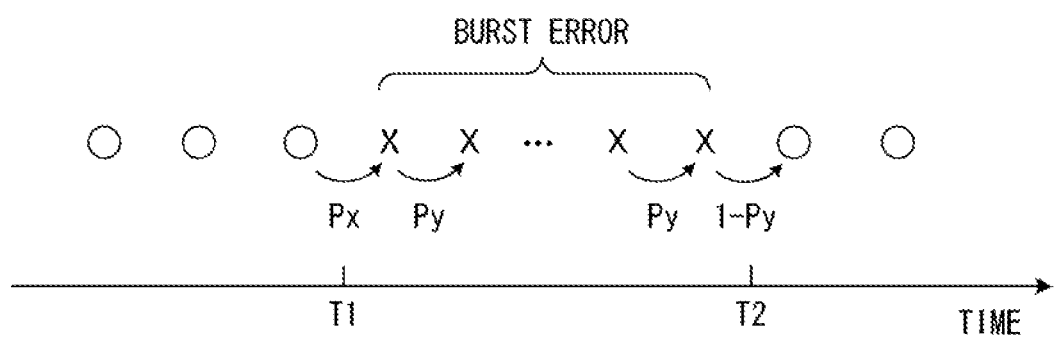

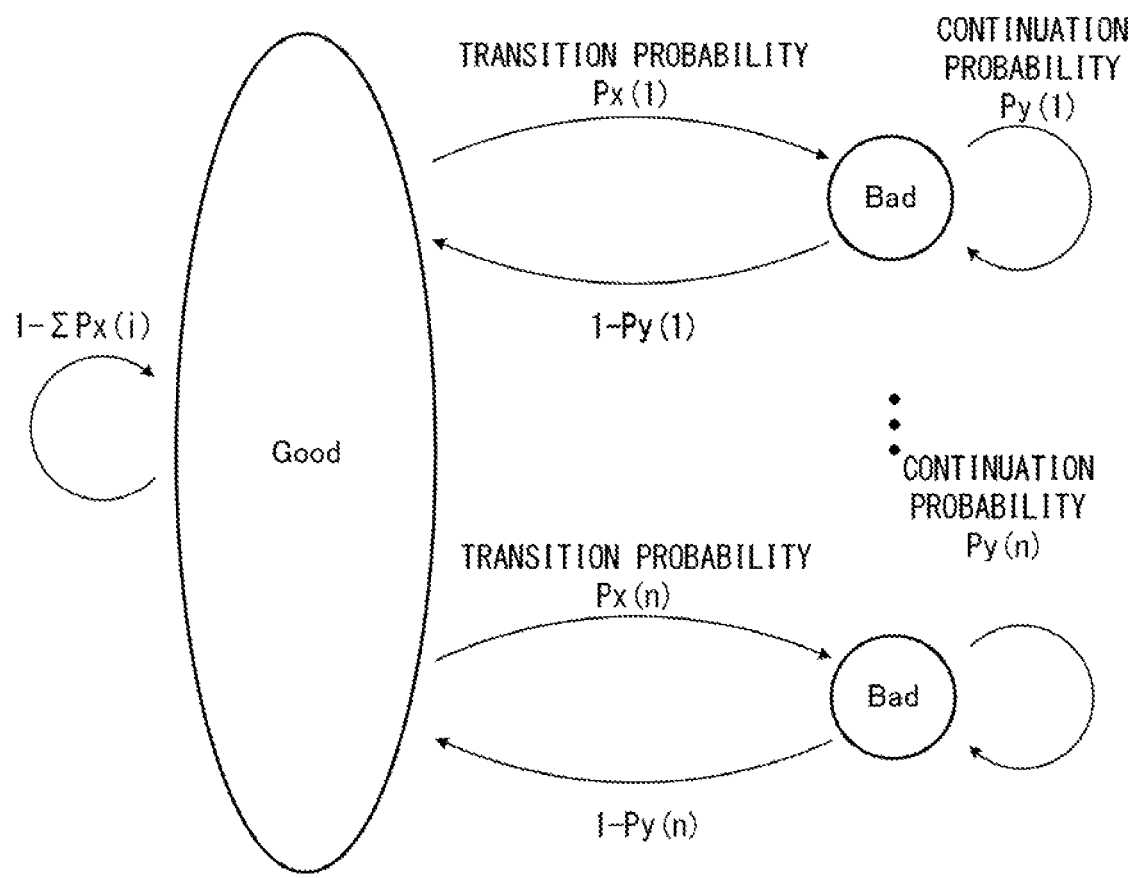
F I G. 5

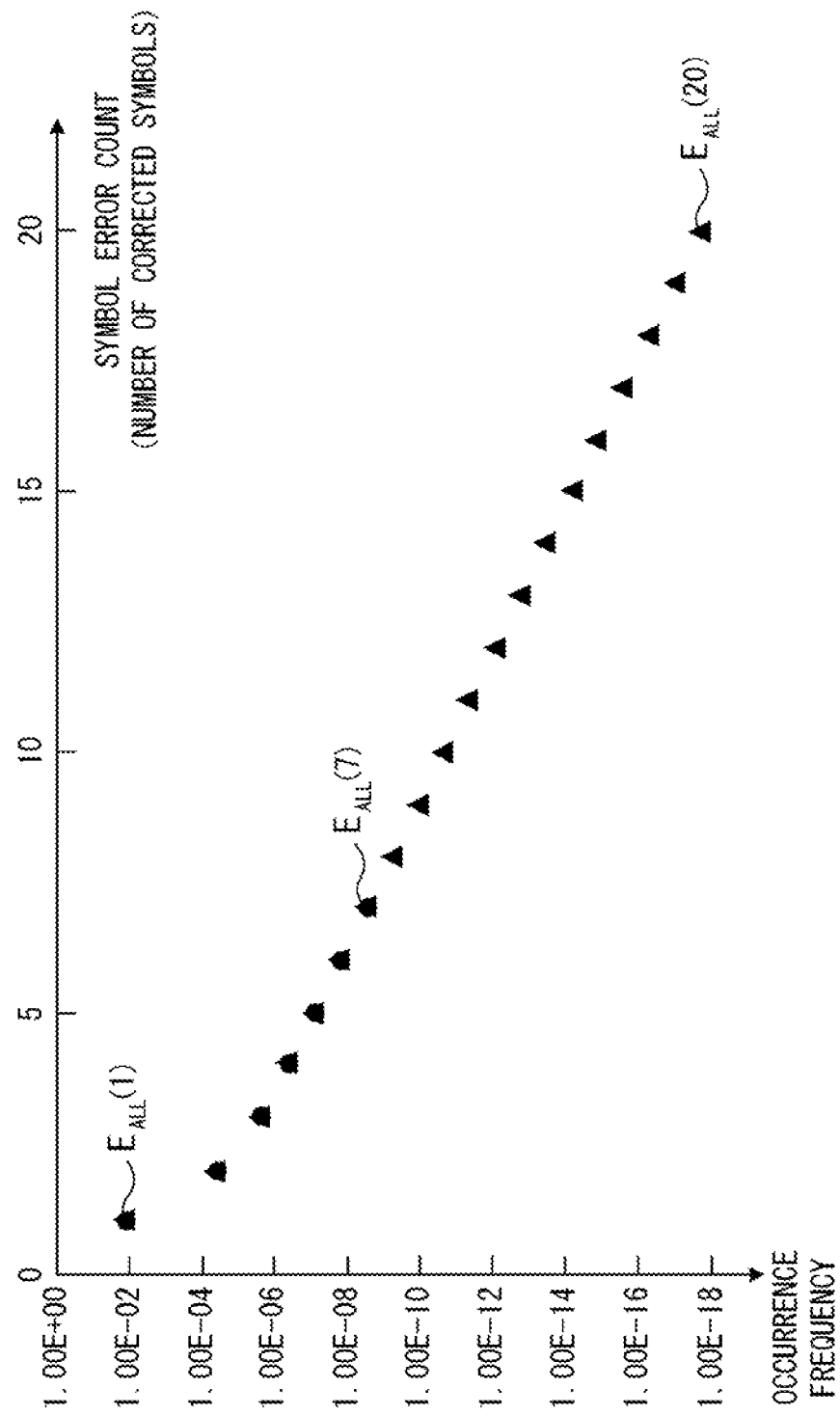
F I G. 8

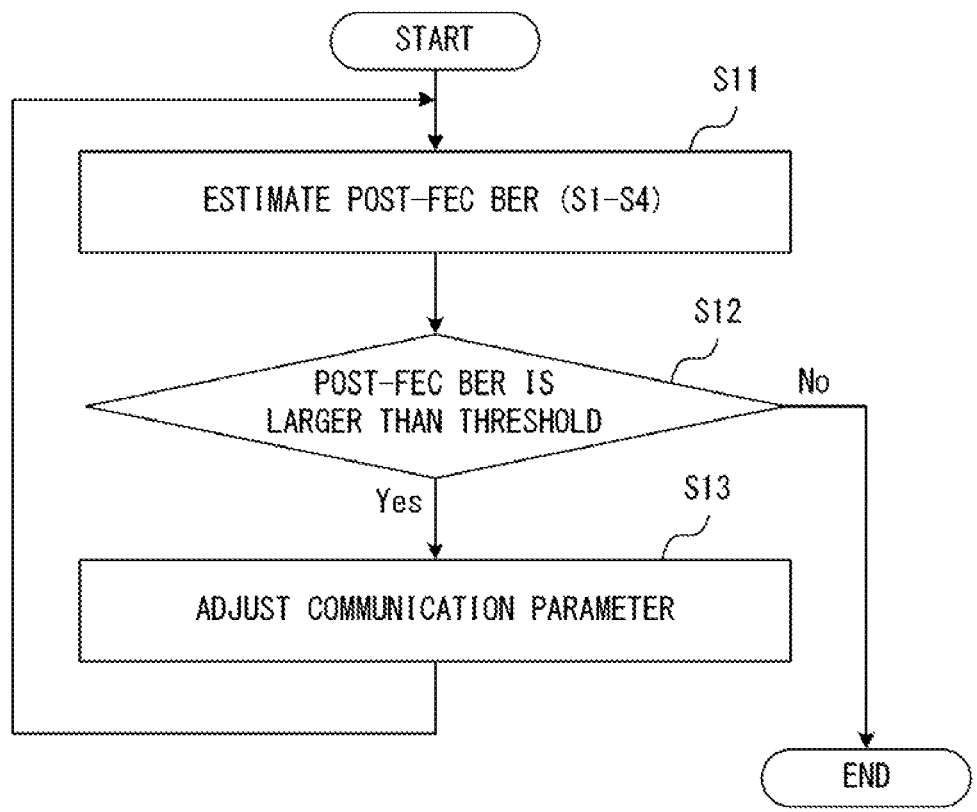
F I G. 11

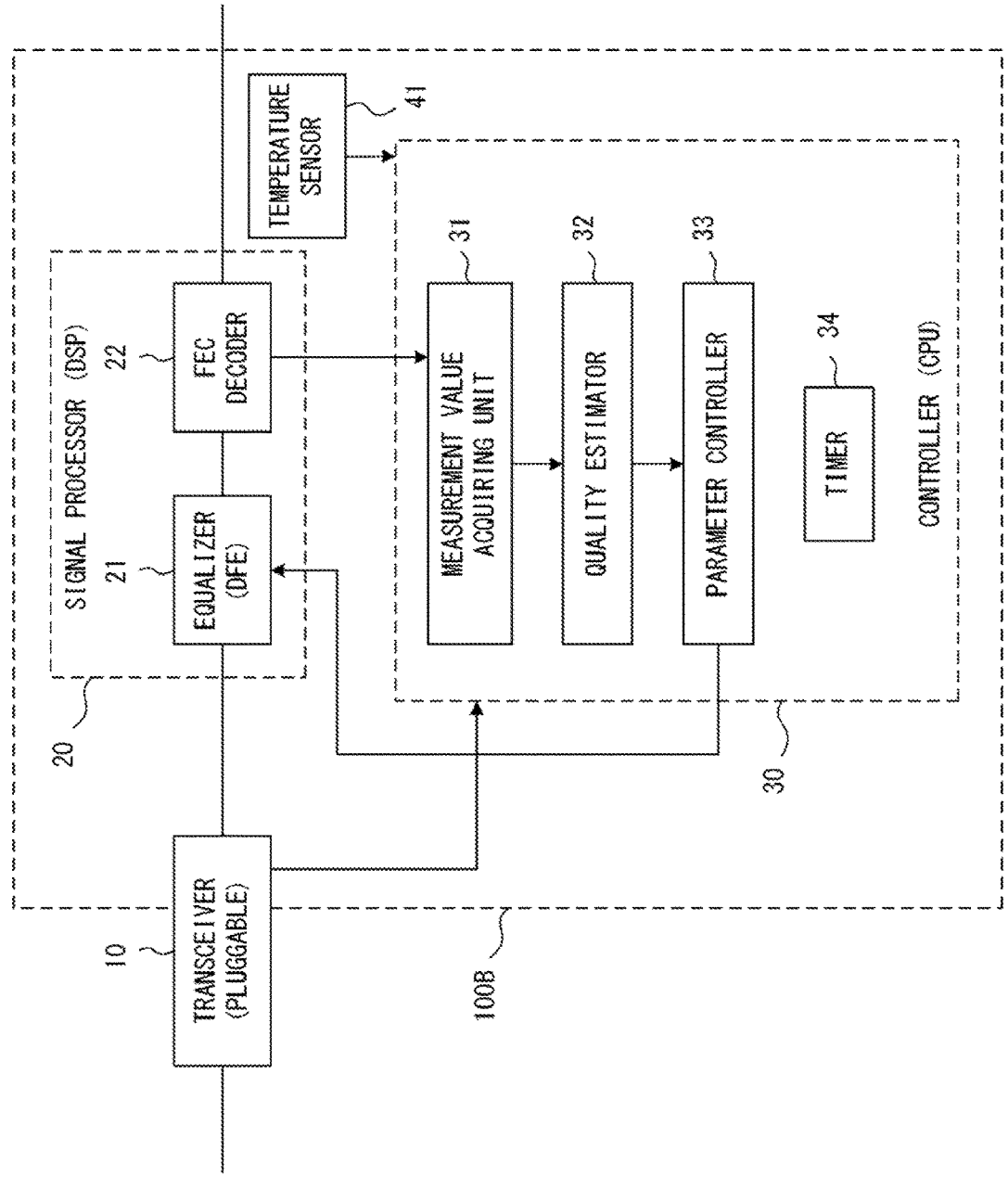
F I G. 13

DEVICE AND METHOD FOR ESTIMATING COMMUNICATION QUALITY

CROSS-REFERENCE TO RELATED APPLICATION

This application is based upon and claims the benefit of priority of the prior Japanese Patent Application No. 2021-004594, filed on Jan. 15, 2021, the entire contents of which are incorporated herein by reference.

FIELD

The embodiments discussed herein are related to a device and a method for estimating communication quality.

BACKGROUND

Pulse amplitude modulation (PAM) 4 has been put into practical use as one technique for implementing high-speed optical communication. PAM 4 is a modulation scheme using four amplitude levels and allows two bits of data to be transmitted for each symbol.

However, PAM 4 tends to worsen signal quality in comparison with non-return to zero (NRZ). Thus, communication devices for transmitting a PAM-4 signal often include a high-level equalizer. For example, a communication device for transmitting a PAM-4 signal may include a decision feedback equalizer (DEF) having a large number of taps. Note that decision feedback equalizers used for a modulated PAM signal have been proposed (e.g., International Publication Pamphlet No. WO 2019/167275).

In the meantime, many communication systems use error connection codes for correcting bit errors (forward error correction: FEC). In this case, the communication system may determine a communication parameter in consideration of not only a bit error that occurs on a transmission line but also the bit error rate of a signal that is obtained after an error correction is performed. A proposed method is one for determining a forward error correction scheme so as to produce a required output bit error rate from an input bit error rate (e.g., Japanese National Publication of International Patent Application No. 2012-529847).

Using a high-level equalizer so as to improve signal quality causes a burst error to tend to occur. For example, a decision feedback equalizer may correct a new input symbol by using one or more past symbols. Thus, a burst error tends to occur when an error occurs. Meanwhile, in comparison with an NRZ signal, it is difficult to recover a clock from a received PAM-4 signal. Thus, a burst error also tends to occur when a clock phase shift occurs due to jitter or wandering.

However, in the prior art, in a case where a burst error occurs, it is difficult to accurately estimate a bit error rate to be obtained after an error correction is performed. In this regard, for example, a communication system may adjust a communication parameter such that a bit error rate to be obtained after an error correction is performed will be lower than a specified threshold. Thus, if the bit error rate to be obtained after the error correction is performed cannot be accurately estimated, the communication parameter may be incapable of being appropriately adjusted, thereby reducing communication quality.

A bit error rate to be obtained after an error correction is performed may be measured by intentionally causing a bit error by controlling a communication parameter. However, it is not preferable to intentionally cause a bit error during operation of communication services. Moreover, the above problem is not limited to PAM-4 communications but also pertains to communications in which a burst error tends to occur.

SUMMARY

According to an aspect of the embodiments, a communication quality estimating device estimates an error rate of a signal that is transmitted using an error correction code capable of correcting K errors. The communication quality estimating device includes a processor configured to obtain a frequency measurement value that indicates a frequency at which a codeword including m errors is received, determine a transition probability and a continuation probability included in each of a plurality of formulae, such that a frequency calculation value that is calculated using the plurality of formulae and indicates a frequency at which a codeword including m errors is received is brought close to the frequency measurement value, the transition probability being a probability that a normal state transitions to an error state, the continuation probability being a probability that the error state continues, calculate a frequency at which a codeword including more than K errors is received, by using the plurality of formulae each with the determined transition probability and the determined continuation probability, and estimate, based on a result of the calculation, an error rate of the signal that is to be obtained after an error correction is performed.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIGS. 4A and 4B illustrate an example of a method for estimating an error occurrence;

FIG. 5 illustrates an example of an error propagation model used by a quality estimator in accordance with embodiments of the present invention;

FIG. 8 illustrates an example of an occurrence frequency for each of symbol error counts calculated using a transition probability and a continuation probability;

FIG. 11 is a flowchart illustrating an example of a method for adjusting a communication parameter of a communication device;

FIG. 13 illustrates a variation of a communication device in accordance with embodiments of the present invention;

DESCRIPTION OF EMBODIMENTS

Figure 1:
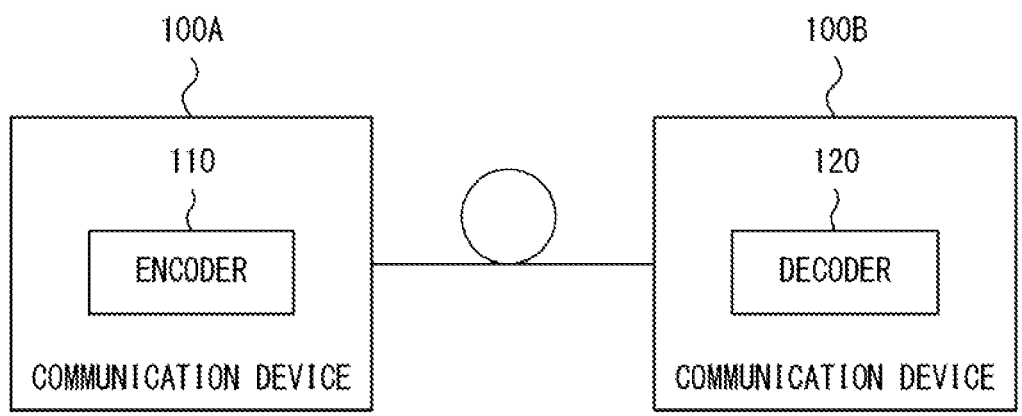
FIG. 1 illustrates an example of a communication system in accordance with embodiments of the present invention.

FIG. 1 illustrates an example of a communication system in accordance with embodiments of the present invention. In this example, the communication system includes a communication device 100A and a communication device 100B. A signal is transmitted from the communication device 100A to the communication device 100B by using an error correction code.

The communication device 100A includes an encoder 110. The encoder 110 generates a codeword by encoding transmission data. In this example, an error correction code is, but is not particularly limited to, Reed-Solomon code (544, 514, 10, 15). In particular, a codeword is formed from 544 symbols and includes 510 information symbols. Each symbol is formed from 10 bits. The number of correctable symbols is 15. A signal encoded by the encoder 110 is transmitted from the communication device 100A to the communication device 100B. The communication devices 100A and 100B are connected by an optical fiber or an electric line.

The communication device 100B includes a decoder 120. The decoder 120 decodes a received signal. In this case, the decoder 120 corrects an error in symbols in a codeword. The decoder 120 counts the number of corrected symbols. However, the number of symbols that the decoder 120 can correct is at most 15 per codeword.

The modulation scheme is, but is not particularly limited to, PAM 4. PAM 4 is a modulation scheme using four amplitude levels and allows two bits of data to be transmitted for each symbol. Thus, each symbol of Reed-Solomon code carries five PAM-4 symbols. In the example depicted in FIG. 1, a signal is transmitted from the communication device 100A to the communication device 100B.

However, a signal preferably can be transmitted bidirectionally between the communication devices 100A and 1008.

Figure 2:
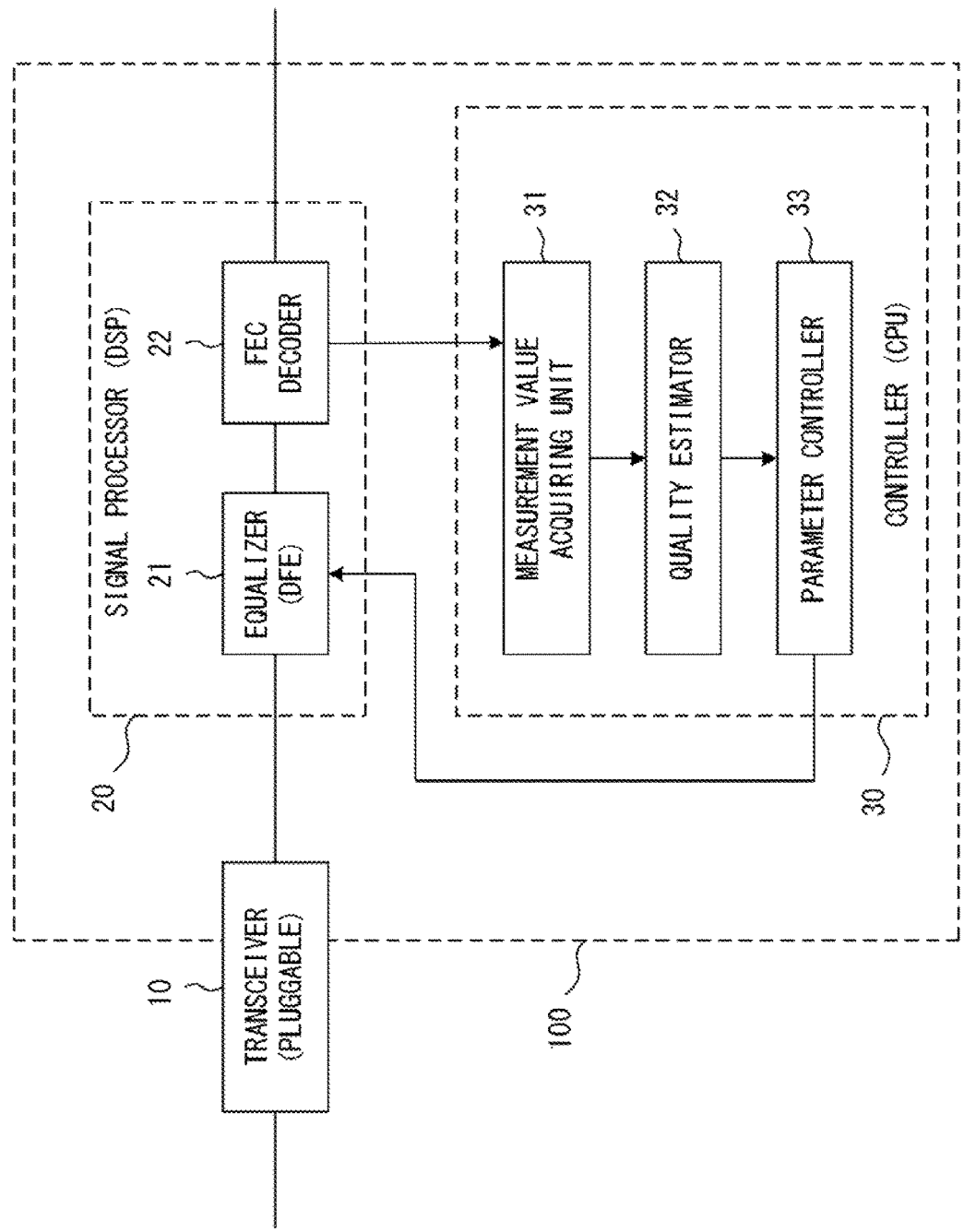
FIG. 2 illustrates an example of a communication device in accordance with embodiments of the present invention.

FIG. 2 illustrates an example of a communication device in accordance with embodiments of the present invention. A communication device 100 includes a transceiver 10, a signal processor 20, and a controller 30. The communication device 100 may include other circuits or functions that are not depicted in FIG. 2. The communication device 100 corresponds to the communication device 100B depicted in FIG. 1.

The transceiver 10 is a pluggable module and receives a signal transmitted from another communication device (in FIG. 1, the communication device 100A). In a case where the communication device 100 receives an optical signal, the transceiver 10 includes a coherent receiver for receiving the optical signal and generates an electric signal indicating the received optical signal.

The signal processor 20 includes an equalizer 21 and an FEC decoder 22. For example, the signal processor 20 may be implemented by a digital signal processor (DSP) or a field programmable gate array (FPGA). The signal processor 20 may have other functions that are not depicted in FIG. 2.

For example, the equalizer 21 may be a decision feedback equalizer (DFE) and equalize the waveforms of an input signal. The decision feedback equalizer corrects a new input symbol by using one or more past symbols.

Figure 3:
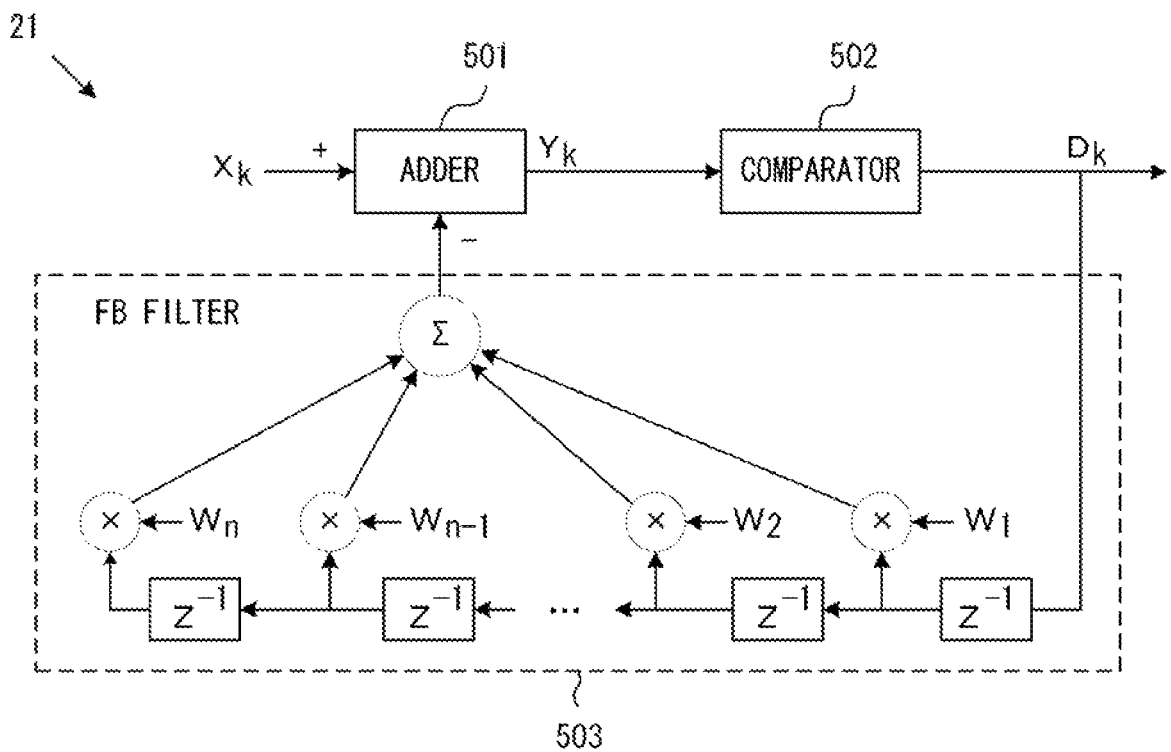
FIG. 3 illustrates an example of a decision feedback equalizer (DFE)

FIG. 3 illustrates an example of a decision feedback equalizer (DFE). In this example, the decision feedback equalizer includes an adder 501, a comparator 502, and a feedback filter 503.

The adder 501 generates a signal Yk by removing an output signal of the feedback filter 503 from an input signal Xk. The output signal of the feedback filter 503 indicates a signal degradation component (e.g., inter-symbol-interference component). Thus, the signal Yk indicates a signal for which the signal degradation component has been compensated for. The comparator 502 decides the value of the signal Yk. As a result, an equalized signal Dk is obtained.

The feedback filter 503 includes delay elements Z, multipliers, and a summation unit. The delay elements Z delay the signal Dk sequentially by a symbol time. Each of the multipliers multiplies a signal Dk output from a corresponding delay element Z by a weight W (W1-Wn). For example, the weight W may be controlled by the controller 30 so as to indicate a signal degradation component. The summation unit calculates the sum of output values of the multipliers. As a result, the signal degradation component of the input signal Xk is obtained. Thus, the signal degradation component is compensated for by the decision feedback equalizer.

The FEC decoder 22 performs an error correction for an output signal of the equalizer 21. That is, the FEC decoder 22 decodes codewords. In this case, the FEC decoder 22 can correct symbol errors in the codewords. When correcting symbol errors, the FEC decoder 22 outputs correction count information indicating the number of corrected symbols in the codewords. In this example, the number of symbols that the FEC decoder 22 can correct is at most 15 per codeword.

The controller 30 includes a measurement value acquiring unit 31, a quality estimator 32, and a parameter controller 33. For example, the controller 30 may be implemented by a processor system that includes a processor and a memory. In this case, by executing a software program stored in the memory, the processor estimates the quality of a received signal and controls the operation of the signal processor 20. The controller 30 may have other functions that are not depicted in FIG. 2.

The measurement value acquiring unit 31 receives correction count information output from the FEC decoder 22. In this example, the measurement value acquiring unit 31 receives correction count information over a specified period. When the number of symbol errors in a codeword is smaller than or equal to the number of correctable errors, the number of errors corrected by the FEC decoder 22 corresponds to the number of symbol errors in the received codeword. Thus, according to correction count information output from the FEC decoder 22, the measurement value acquiring unit 31 can calculate a frequency at which a codeword including m (m=1, 2, . . . ) symbol errors arrives. Note that information indicating a frequency at which a codeword including m (m=1, 2, . . . ) symbol errors arrives may hereinafter be referred to as a "frequency measurement value."

The quality estimator 32 estimates communication quality according to correction count information or a frequency measurement value. In particular, the quality estimator 32 estimates a bit error rate to be obtained after an error correction is performed by the FEC decoder 22. In this example, when the number of symbol errors in one codeword is smaller than or equal to 15, the errors are corrected by the FEC decoder 22. Hence, when the number of symbol errors in one codeword is larger than 15, errors will remain in an output signal of the FEC decoder 22. Note that a bit error rate obtained after an error correction is performed may hereinafter be referred to as a "post-FEC BER."

A transmission line may be evaluated using a bit error rate obtained before an error correction is performed. However, a bit error rate obtained after an error correction is performed is important for evaluation of the quality of end-to-end communication. Accordingly, the quality estimator 32 has a function for estimating a post-FEC BER.

The parameter controller 33 controls the signal processor 20 according to a post-FEC BER estimated by the quality estimator 32. For example, the parameter controller 33 may adjust the communication parameter of the equalizer 21 such that the post-FEC BER is lower than a specified threshold. In this case, the parameter controller 33 may control the weights W1 through Wn depicted in FIG. 3 and/or the number of taps. As a result, desired communication quality is attained.

FIGS. 4A and 4B illustrate an example of a method for estimating an error occurrence. In this example, an error occurrence is estimated using a two-state error propagation model. In the two-state error propagation model, two states are defined as depicted in FIG. 4A. A normal state (GOOD) indicates a state in which no errors have occurred, and an error state (Bad) indicates a state in which an error has occurred. Px indicates the probability that the normal state transitions to the error state. Accordingly, the probability that the normal state continues is expressed by 1-Px. Py indicates the probability that the error state continues. Accordingly, the probability that the error state transitions to the normal state is expressed by 1-Py.

FIG. 4B depicts an example of the state of a received symbol. A mark "○ (white circle)" indicates a normal symbol, and a mark "x" indicates a symbol in which an error has occurred. No errors have occurred before time T1.

Errors in received symbols are detected at time T1. In this example, the probability that an error occurs in a certain symbol (i.e., the probability that the normal state transitions to the error state) is Px. Typically, the transition probability Px is sufficiently low.

The probability that the symbol next to the symbol in which an error has been detected is erroneous (i.e., the probability that the error state continues) is Py. For example, when PAM 4 is used as the modulation scheme and the communication device 100 uses a high-level equalizer, the continuation probability Py may be high. When continuation probability Py is high, a symbol error tends to continue. In this example, the symbol error continues during the period from time T1 to time T2. That is, a burst error has occurred. Normal symbols are detected at time T2. The probability of returning from the error state to the normal state is expressed by 1-Py.

Accordingly, an occurrence of a symbol error can be estimated when the transition probability Px and continuation probability Py are known in the two-state error propagation model. In this example, the FEC decoder 22 can correct at most 15 symbol errors in a codeword. Thus, a post-FEC BER can be estimated by calculating the probability that, or a frequency at which, 16 or more symbol errors occur in a codeword.

The error propagation model depicted in FIG. 4A indicates communication in which there is one factor that causes a symbol error. However, in actual communication, a symbol error may occur due to a plurality of factors. Accordingly, a communication quality estimating device in accordance with embodiments of the prevent invention estimates a post-FEC BER by using an error propagation model indicating communication in which a symbol error occurs due to a plurality of factors.

FIG. 5 illustrates an example of an error propagation model used by a quality estimator 32 in accordance with embodiments of the present invention. The error propagation model in accordance with embodiments of the present invention indicates communication in which a symbol error may occur due to a plurality of factors. The error propagation model depicted in FIG. 5 indicates communication in which a symbol error occurs due to n factors. n is an integer that is larger than or equal to 2. The error states depicted in FIG. 5 (Bad(1) to Bad(n)) each correspond to a factor that causes a symbol error.

The transition probability Px and the continuation probability Py in FIG. 5 are substantially the same as those in FIG. 4A. However, the transition probability Px and the continuation probability Py are determined for each error factor. For example, Px(1) indicates the probability that a normal state transitions to an error state due to factor(1). Likewise, Px(n) indicates the probability that the normal state transitions to an error state due to factor(n). Thus, the probability that the normal state continues is expressed by 1-(Px(1)+ . . . +Px(n)). Py(1) indicates the probability that the error state continues due to factor(1). Thus, the probability that the error state caused by factor(1) transitions to the normal state is expressed by 1-Py(1). Likewise, Py(n) indicates the probability that an error state caused by factor (n) continues. Thus, the probability that the error state caused by factor(n) transitions to the normal state is expressed by 1-Py(n). Accordingly, the error propagation model indicates transitions between one normal state and a plurality of error states and includes the probabilities that one normal state transitions to each of the error states and continuation probabilities that are the probabilities that each of the error states continues. Note that the error propagation model is expressed by a plurality of formulae.

Figure 6:
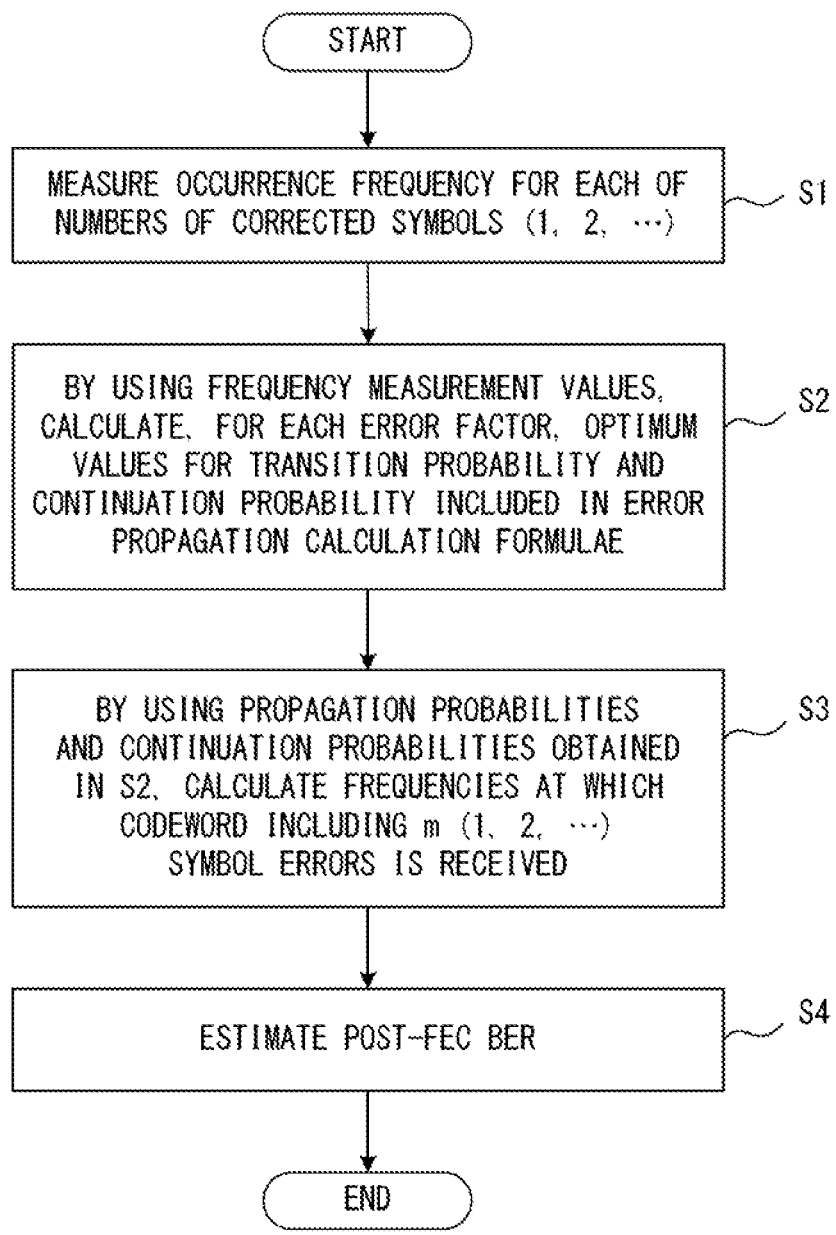
FIG. 6 is a flowchart illustrating an example of a method for estimating a post-FEC BER.

FIG. 6 is a flowchart illustrating an example of a method for estimating a post-FEC BER. For example, the processes of this flowchart may be periodically performed by the controller 30. Alternatively, the controller 30 may perform the processes depicted in FIG. 6 in accordance with an instruction from a network administrator. In addition, the controller 30 may perform the processes depicted in FIG. 6 when a specified condition (e.g., a temperature change) is satisfied.

In S1, the measurement value acquiring unit 31 acquires correction count information from the FEC decoder 22. In particular, the FEC decoder 22 sequentially decodes codewords received by the communication device 100 and counts the number of corrected symbols for each of the codewords. Then, the FEC decoder 22 outputs correction count information indicating the number of corrected symbols. When the number of symbol errors that have occurred in codewords does not exceed the correction capability of the FEC decoder 22, the FEC decoder 22 can correct all of the symbol errors. Thus, in this case, the number of corrected symbols is equal to the number of symbol errors that have occurred in the codewords received by the communication device 100. The measurement value acquiring unit 31 obtains the occurrence frequencies of the symbol error counts (1, 2, . . . ) of the codewords.

Assume, for example, that the FEC decoder 22 decodes 100 millions ($10^9$) codewords in a specified monitor period. Also assume that, in the 100 millions codewords, one symbol error is corrected for every 100000 ($10^5$) codewords, two symbol errors are corrected for every 10000 ($10^4$)

codewords, and three symbol errors are corrected for every 1000 ($10^3$) codewords. In this case, the frequency at which one symbol error occurs is $10^{-4}$, the frequency at which two symbol errors occur is $10^{-5}$, and the frequency at which three symbol errors occur is $10^{-6}$.

As described above, the measurement value acquiring unit 31 calculates frequency measurement values indicating the frequencies at which a codeword including m (1, 2, . . . ) symbol errors is received. However, the frequency at which a codeword including many symbol errors is received is supposed to be low. Thus, a long monitor time is required to measure the frequency at which a codeword including many symbol errors is received. Accordingly, the measurement value acquiring unit 31 measures the occurrence frequencies of codewords including fewer symbol errors than a specified number.

Figure 7:
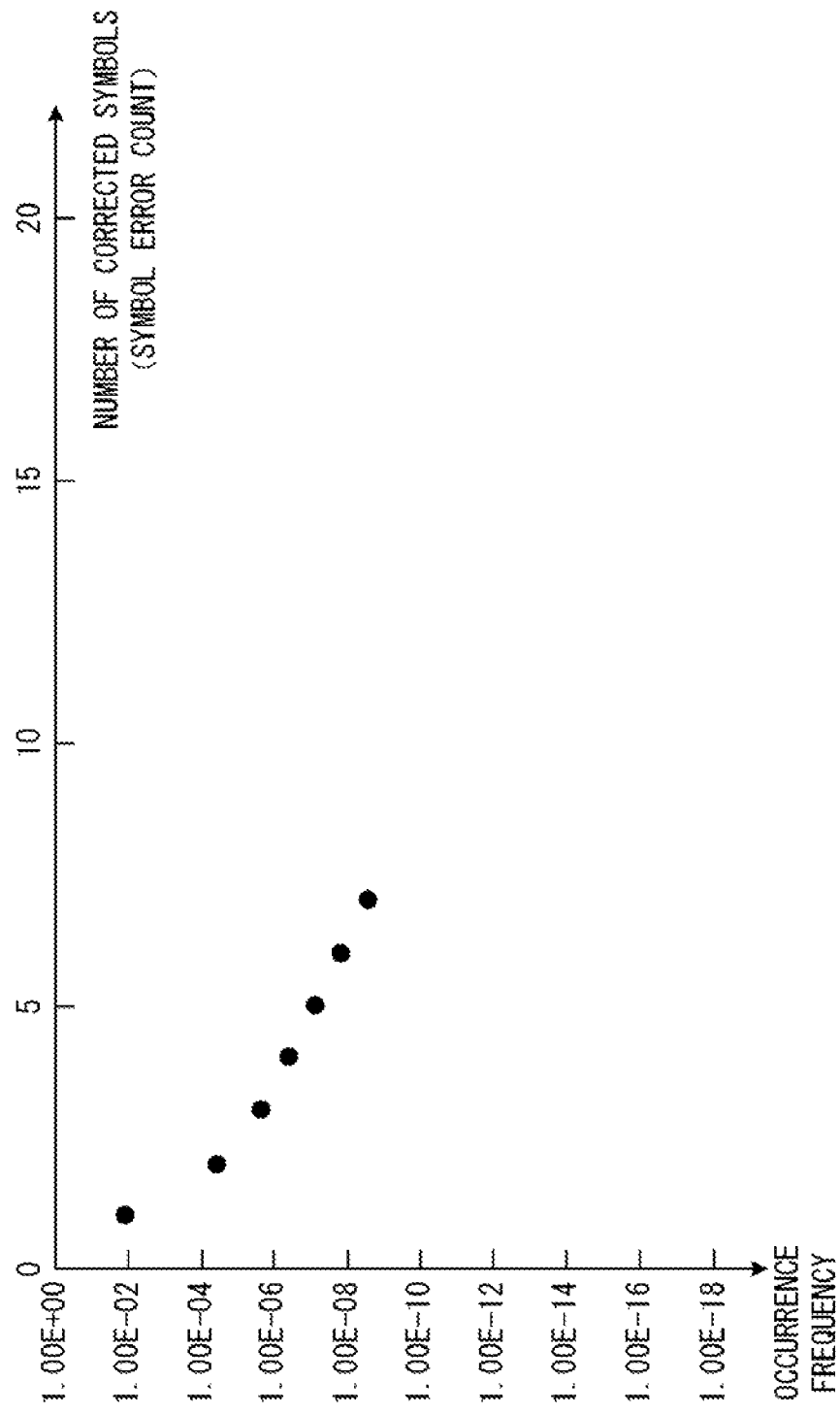
FIG. 7 illustrates an example of frequency measurement values calculated by a measurement value acquiring unit.

FIG. 7 illustrates an example of frequency measurement values calculated by the measurement value acquiring unit 31. In this example, the frequencies at which a codeword with the number of corrected symbols (i.e., symbol error count) being "1" to "7" is received are measured. A mark "• (black circle)" indicates a measurement value. For example, the frequency at which a codeword including one corrected symbol is received may be about $10^{-2}$, and the frequency at which a codeword including six corrected symbols is received may be about $10^{-8}$. The measurement value acquiring unit 31 stores the calculated frequency measurement values in a memory (not illustrated).

In S2, by using the frequency measurement values obtained by the measurement value acquiring unit 31, the quality estimator 32 calculates optimum values for a transition probability and a continuation probability included in each of error calculation formulae corresponding to error factors. The error calculation formulae corresponding to error factors, which are prepared in advance, are as follows.

$$E(m,n)=Px(n) \quad (1)$$

m=1

$$E(m,n)=E(m-1,n) \times Py(n) \quad (2)$$

m≥2

In the error calculation formulae, m indicates the symbol error count of a codeword. That is, m indicates the number of symbol errors in a codeword. n identifies an error factor. As described above by referring to FIG. 5, Px indicates the probability that a normal state transitions to an error state. Thus, for example, Px(1) may indicate the probability that a normal state transitions to an error state due to factor(1), and Px(2) may indicate the probability that a normal state transitions to an error state due to factor(2). As described above by referring to FIG. 5, Py indicates the probability that an error state continues. Thus, for example, Py(1) may indicate the probability that the error state caused by factor (1) continues, and Py(2) may indicate the probability that the error state caused by factor (2) continues.

Formula 1 is used when m=1 is satisfied, and indicates the frequency at which one symbol error occurs in a codeword due to factor(n). Thus, a frequency E(1,n) at which one symbol error occurs is equal to an occurrence probability Px(n).

Formula 2 indicates the frequency at which m symbol errors occur in a codeword due to factor(n). In a case where m symbol errors occur in a codeword, m−1 symbol errors occur in the codeword, and then the errors continue in the following symbol. Thus, a frequency E(m,n) at which m symbol errors occur is calculated by multiplying a frequency E(m−1,n) at which m−1 symbol errors occur by the continuation probability Py.

The quality estimator 32 estimates a post-FEC BER in consideration of a plurality of error factors. In this case, the number of error factors is not particularly limited but may be determined according to, for example, the characteristics of communication. As an example, two sets of error calculation formulae may be prepared when there are two main factors considered to cause a symbol error, and three sets of error calculation formulae may be prepared when there are three main factors considered to cause a symbol error.

The quality estimator 32 performs fitting for an error propagation model by using the frequency measurement value obtained in S1. In this example, the error propagation model is expressed by a plurality of sets of error calculation formulae. Thus, the quality estimator 32 determines variables (a transition probability and a continuation probability) for each error calculation formulae such that the frequency calculation values calculated using the error propagation model are brought close to the frequency measurement values.

For example, when the error propagation model is represented by two error factors, the following two sets of error calculation formulae 3.1 and 3.2 are prepared. In the example depicted in FIG. 7, the value of m is "2" to "7."

$$\text{Factor } 1 \begin{cases} E(1, 1) = Px(1) \\ E(m, 1) = E(m-1, 1) \times Py(1) \end{cases} \quad (3.1)$$

$$\text{Factor } 2 \begin{cases} E(1, 2) = Px(2) \\ E(m, 2) = E(m-1, 2) \times Py(2) \end{cases} \quad (3.2)$$

In this case, the quality estimator 32 calculates optimum values for the four variables (Px(1), Py(1), Px(2), Py(2)). For example, the quality estimator 32 may calculate optimum values for the variables by using a steepest descent method. In particular, the value of each of the variables is varied to determine an optimum value for each of the variables such that frequency calculation values indicating calculation results of the plurality of error correction formulae are brought close to frequency measurement values. Alternatively, the quality estimator 32 may calculate optimum values for the variables by using another method.

For example, in the error propagation model, the occurrence frequency of "symbol error count=1" may be the sum of E(1,1) and E(1,2). That is, this frequency is the sum of Px(1) and Px(2). The variable is adjusted such that this calculation result is brought close to the measurement value of the occurrence frequency of "number of corrected symbols=1."

In the error propagation model, the occurrence frequency of "symbol error count=2" is the sum of E(2,1) and E(2,2). Thus, this frequency is calculated according to E(1,1), Py(1), E(1,2), and Py(2). The variables are adjusted such that this calculation result is brought close to a measurement value for the occurrence frequency of "number of corrected symbols=2." Similar processes are performed for "symbol error count=3" to "symbol error count=7." As a result, optimum values are obtained for the transition probability and the continuation probability in each of the error calculation formulae corresponding to the error factors.

In S3, the quality estimator 32 calculates the occurrence frequency of each symbol error count by using the transition probability and the continuation probability calculated in S2.

In particular, the frequency at which a codeword including m (1, 2, ... ) symbol errors is received is calculated. In this example, the frequency at which a codeword including m symbol errors is received is calculated using the following formula 4.

$$E_{ALL}(m) = \sum_n E(m, n) \quad (4)$$

$E_{ALL}(m)$ indicates the frequency at which a codeword including m symbol errors is received. Thus, when, for example, the error propagation model is represented by two error factors, $E_{ALL}(m)$ indicates the sum of the frequency at which m symbol errors occur due to factor (1) and the frequency at which m symbol errors occur due to factor (2). When the error propagation model is represented by three error factors, $E_{ALL}(m)$ indicates the sum of the frequency at which m symbol errors occur due to factor (1), the frequency at which m symbol errors occur due to factor (2), and the frequency at which m symbol errors occur due to factor (3).

FIG. 8 illustrates an example of an occurrence frequency for each of symbol error counts calculated using a transition probability and a continuation probability. In FIG. 8, marks "▲ (black triangle)" indicate calculation results of an occurrence frequency $E_{ALL}(1)$ for a case with a symbol error count of "1" to an occurrence frequency $E_{ALL}(20)$ for a case with a symbol error count of "20." Occurrence frequencies $E_{ALL}(1)$-$E_{ALL}(7)$ substantially match corresponding measurement values (marks "•").

In S4, the quality estimator 32 estimates a post-FEC BER according to the occurrence frequencies E calculated for the symbol error counts in S3. In this example, the sum of the occurrence frequencies E calculated for the symbol error counts in S3 corresponds to the symbol error rate of the received signal. However, the FEC decoder 22 can correct a specified number of symbol errors per codeword. In this example, the correction capability of the FEC decoder 22 is 15 symbols. Thus, when a codeword includes 15 or less symbol errors, the error count after error correction will be zero. Thus, the post-FEC BER may be estimated in consideration of the occurrence frequencies of cases with a symbol error count of 16 or more. Accordingly, the post-FEC BER is expressed by the following formula 5.

$$PostFECBER \cong 10 \times 16 \times \sum_{m=16}^{514} E_{ALL}(m) \quad (5)$$

That is, the post-FEC BER is calculated according to the sum of the occurrence frequencies of cases with a symbol error count of 16 or more. Note that "10" in formula 5 indicates the number of bits carried by one symbol of Reed-Solomon code. Since 16 or more symbol errors occur in a codeword, "16" is a value approximate to the number of symbol errors that occur in the codeword. In addition, the number of information symbols of a codeword transmitted in this example is 514, so the sum of the frequencies corresponding to a value m of 16 to 514 is calculated.

Figure 9:
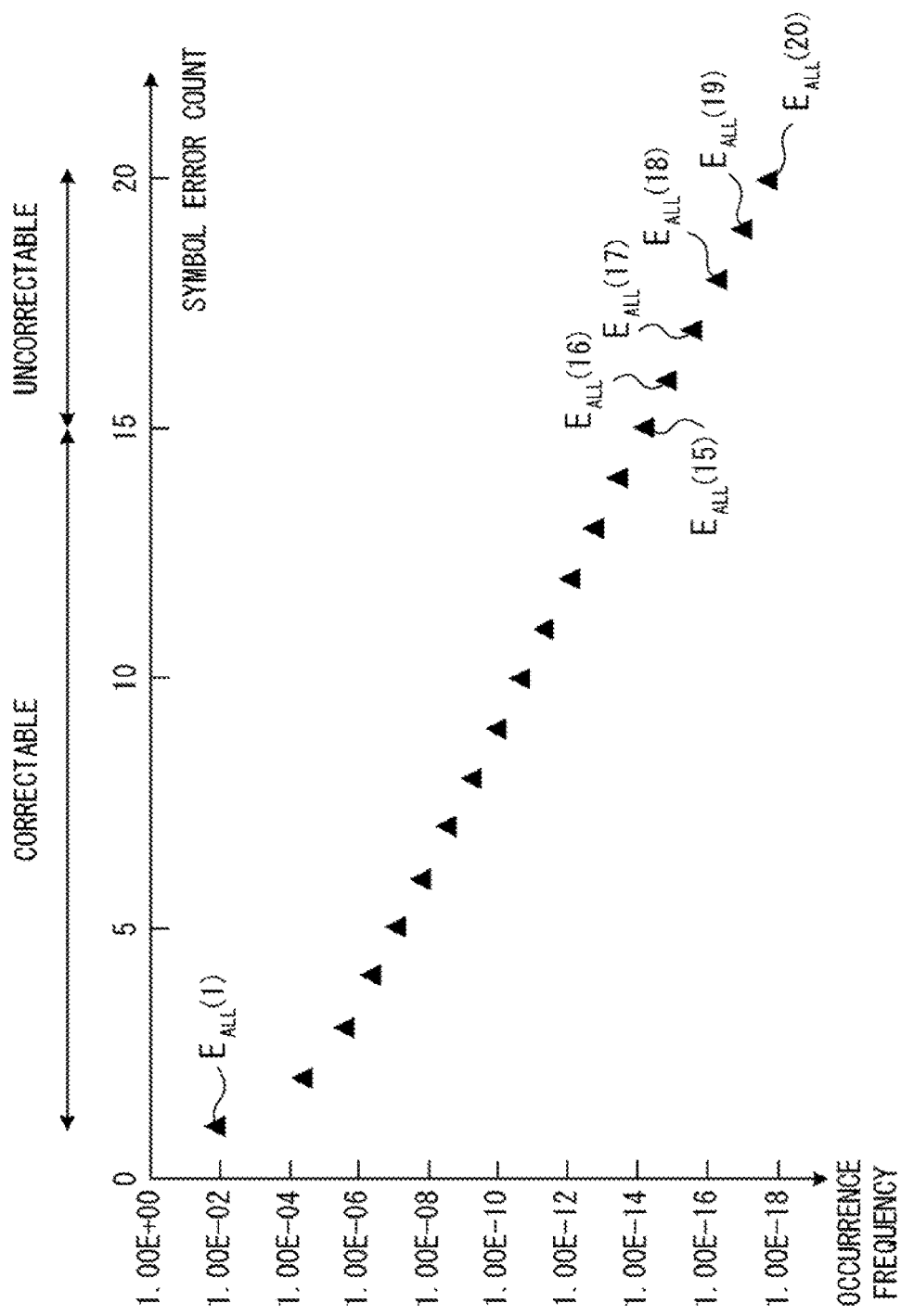
FIG. 9 is an explanatory diagram for a method for estimating a post-FEC BER.

FIG. 9 is an explanatory diagram for a method for estimating a post-FEC BER. In this example, an error propagation model is represented by two error factors. For factor(1) and factor(2), it is assumed that the frequencies at which a codeword including 16 symbol errors is received are respectively as follows in accordance with formulae 3.1 and 3.2.

$E(15,1)=10^{-15}$ $E(15,2)=10^{-16}$

In addition, the continuation probability Py(1) of factor(1) and the continuation probability Py(2) of factor (2) are each 0.1.

In this case, the frequencies at which a codeword including 16 symbol errors is received are as follows.

$E(16,1)=10^{-15} \times 0.1$ $E(16,2)=10^{-16} \times 0.1$ $E_{ALL}(16)=E(16,1)+E(16,2)=1.1 \times 10^{-16}$ The frequencies at which a codeword including 17 symbol errors is received are as follows.

$E(17,1)=10^{-16} \times 0.1$ $E(17,2)=10^{-17} \times 0.1$ $E_{ALL}(17)=E(17,1)+E(17,2)=1.1 \times 10^{-17}$ Similarly, the frequencies at which a codeword including 18 or more symbol errors is received are calculated. However, as the symbol error count increases, the occurrence frequency exponentially decreases. Thus, a case where the occurrence frequency can substantially be deemed as zero can be negligible in estimation of a post-FEC BER. For example, in a case where the frequencies at which a codeword including more than 20 symbol errors is received can be substantially deemed as zero, the quality estimator 32 may estimate a post-FEC BER according to the sum of the frequencies at which a codeword including 16-20 symbol errors is received.

As described above, the quality estimator 32 estimates the post-FEC BER of a received signal by using the approximation formulae defined in the error propagation model. In this regard, the error propagation model in embodiments of the present invention is created in consideration of a plurality of error factors. Hence, the error propagation model in embodiments of the present invention can accurately represent an actual communication state (i.e., measurement values of symbol error counts). As a result, the quality estimator 32 can accurately estimate a post-FEC BER.

Figure 10:
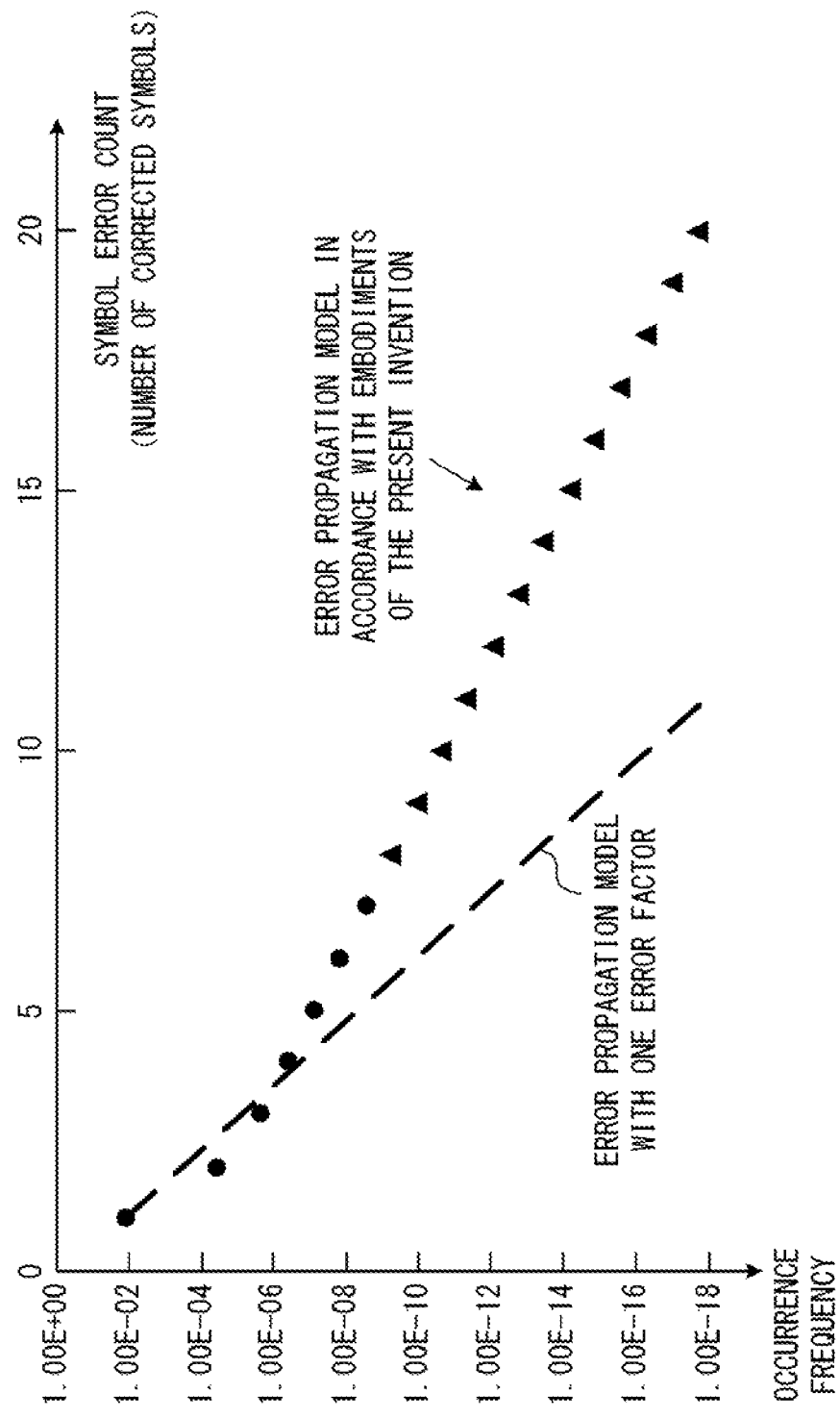
FIG. 10 illustrates an example of the effect by the embodiments of the present invention.

FIG. 10 illustrates an example of the effect by the embodiments of the present invention. Here, the embodiment of the present invention is compared with an error propagation model with one error factor. In the error propagation model with one error factor, occurrence frequencies are expressed using one exponentiation function. Hence, it is difficult to make the error propagation model fit for measurement values. In the example depicted in FIG. 10, a mark "•" indicates a frequency measurement value, and a dashed line indicates frequencies calculated using the error propagation model with one error factor. Hence, it is difficult to accurately estimate a post-FEC BER by using this method.

By contrast, in the error propagation model in embodiments of the present invention, occurrence frequencies are expressed by a combination of a plurality of exponentiation functions. Thus, the error propagation model can be made fit for measurement values. Hence, a post-FEC BER can be accurately estimated in accordance with embodiments of the present invention.

FIG. 11 is a flowchart illustrating an example of a method for adjusting a communication parameter of the communication device 100. For example, the processes of this flowchart may be periodically performed by the controller 30. Alternatively, the controller 30 may perform the processes depicted in FIG. 11 in accordance with an instruction from a network administrator.

In S11, the controller 30 estimates a post-FEC BER. S11 corresponds to S1-S4 in the flowchart depicted in FIG. 6. Thus, the post FEC BER is estimated by the quality estimator 32.

In S12, the parameter controller 33 compares the post-FEC BER obtained in S11 with a specified threshold. For example, the threshold may be a maximum bit error rate defined in a communication system in which the communication device 100 is operated. When the post-FEC BER is larger than the threshold, the process of the controller 13 shifts to S13.

In S13, the parameter controller 33 adjusts the communication parameter of the communication device 100. As an example, the parameter controller 33 may control a parameter indicating the operation of the equalizer 21. For example, when the equalizer 21 is the decision feedback equalizer depicted in FIG. 3, the tap coefficients (i.e., weights W1-Wn) may be adjusted. Alternatively, the number of taps of the equalizer may be adjusted. Subsequently, the process of the controller 30 returns to S11.

The controller 30 repeatedly performs the processes of S11-S13 until the post-FEC BER becomes smaller than or equal to the threshold. When the post-FEC BER becomes smaller than or equal to the threshold, the process of the controller 30 ends.

As described above, the communication device 100 adjusts the communication parameter such that the post-FEC BER becomes smaller than or equal to the threshold. In this case, the post-FEC BER is accurately estimated by the quality estimator 32. Accordingly, the controller 30 can appropriately adjust the reception quality of the communication device 100. The controller 30 can estimate the post-FEC BER without stopping the communication service provided by the communication device 100 or without intentionally causing an error.

Figure 12:
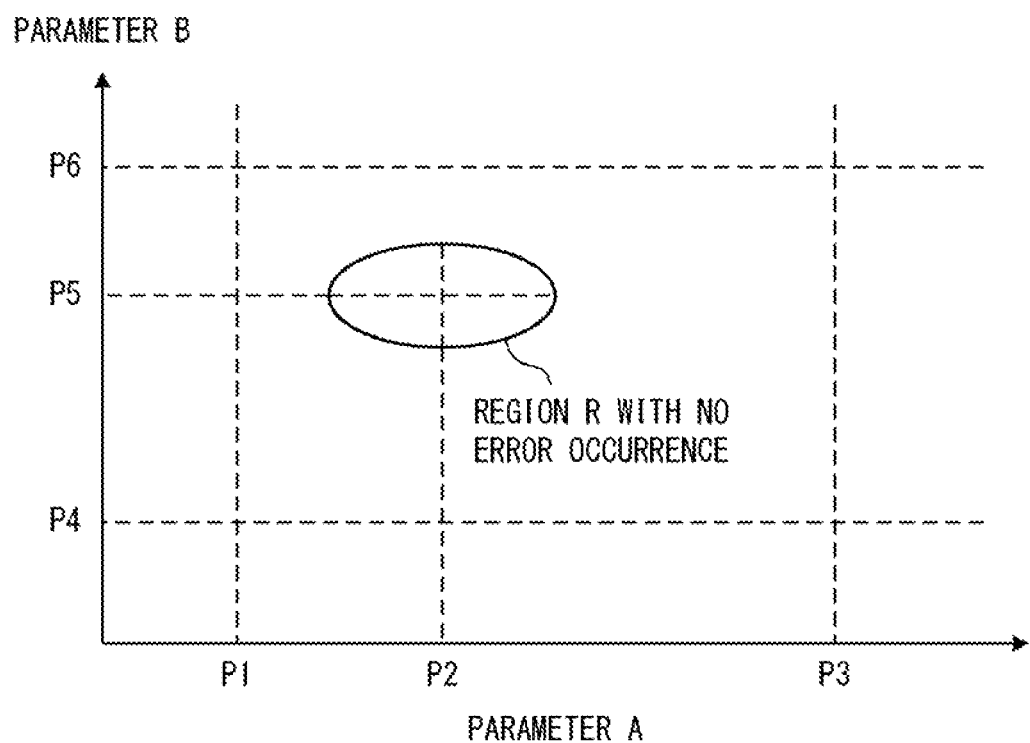
FIG. 12 illustrates an example of a method for adjusting communication parameters by intentionally casing an error.

FIG. 12 illustrates an example of a method for adjusting communication parameters by intentionally causing an error. In this example, the presence/absence of an error is detected while sweeping a communication parameter A between P1 and P3 and sweeping a communication parameter B between P4 and P6. Assume that no errors are detected in a region R. In this case, the communication parameters are set to values corresponding to the center of the region R. That is, the communication parameter A is set to P2, and the communication parameter B is set to P5. However, the center of the region R is not necessarily optimum values for the communication parameters. Thus, in this method, an error may occur when adjusting the communication parameters, and in addition, suitable communication parameters may not be obtained.

VARIATION

An error rate is considered to vary due to the following factors.
(1) Temperature of the processing chip (signal processor 20)
(2) Degradation of elements on a transmission line (e.g., optical fiber, electrical device, power source)
(3) Resynchronization of a SerDes implemented in the transceiver 10

Accordingly, the communication device preferably estimates a post-FEC BER with these factors as a trigger.

FIG. 13 illustrates a variation of the communication device in accordance with embodiments of the present invention. A communication device 100B includes a temperature sensor 41 and a timer 34 in addition to the configuration depicted in FIG. 2. The temperature sensor 41 measures the temperature of the signal processor 20. The timer 34 counts an elapsed time since a time at which a post-FEC BER is estimated. In addition, a serializer/deserializer (SeRDes) (not illustrated) is implemented in the transceiver 10. The SerDes performs a resynchronization process when recovery from signal disconnection is attained. When the resynchronization process ends, the transceiver 10 sends a recovery message to the controller 30.

Figure 14:
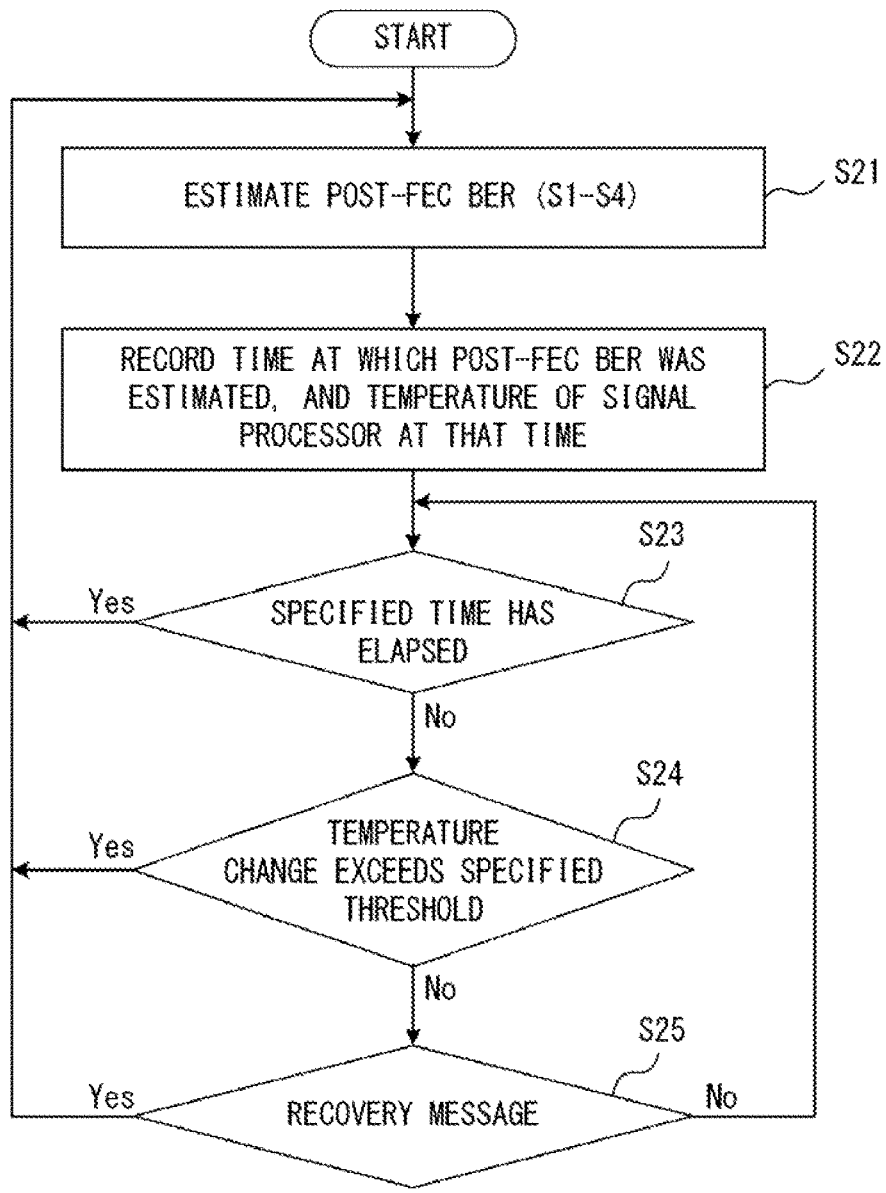
FIG. 14 is a flowchart illustrating an example of a method for determining a trigger to estimate a post-FEC BER.

FIG. 14 is a flowchart illustrating an example of a method for determining a trigger to estimate a post-FEC BER. The processes of this flowchart are performed by the communication device 100B depicted in FIG. 13.

In S21, the controller 30 estimates a post-FEC BER. S21 corresponds to S1-S4 in the flowchart depicted in FIG. 6. Thus, the post FEC BER is estimated by the quality estimator 32.

In S22, the controller 30 records, in a memory (not illustrated), the time at which the post-FEC BER was estimated and the temperature of the signal processor 20 at that time. The temperature of the signal processor 20 is measured by the temperature sensor 41.

In S23, the controller 30 decides whether the elapsed time since the time recorded in S22 has exceeded a specified threshold. That is, it is decided whether the elapsed time since the previous estimating has exceeded the threshold. For example, the threshold may be one hour. When the elapsed time since the previous estimating has not exceeded the threshold, the process of the controller 30 shifts to S24.

In S24, the controller 30 decides whether a change from the temperature recorded in S22 has exceeded a specified threshold. That is, it is decided whether the temperature change that has occurred after the previous estimating was performed has exceeded the threshold. For example, the threshold may be 5 degrees. When the temperature change that has occurred after the previous estimating was performed has not exceeded the threshold, the process of the controller 30 shifts to S25.

In S25, the controller 30 decides whether a recovery message has been received from the transceiver 10. In particular, it is decided whether the SerDes has performed resynchronization. When the SerDes has not performed resynchronization, the process of the controller 30 returns to S23.

As described above, the controller 30 waits for the triggers of S23-S25. When any of the triggers of S23-S25 occurs, the process of the controller 30 returns to S21. That is, when any of the triggers of S23-S25 occurs, the controller 30 estimates a post-FEC BER. Then, the communication device 100B performs the processes of the flowchart depicted in FIG. 11. Thus, when there is a factor that could change the error rate, the communication device 100B can immediately update the communication parameter. Accordingly, stable quality is ensured.

In the configuration depicted in FIG. 2, the controller 30 implemented in the communication device 100 estimates a post-FEC BER. However, the present invention is not limited to this configuration. In particular, a post-FEC BER may be estimated using a computer connected to the communication device 100.

Figure 15:
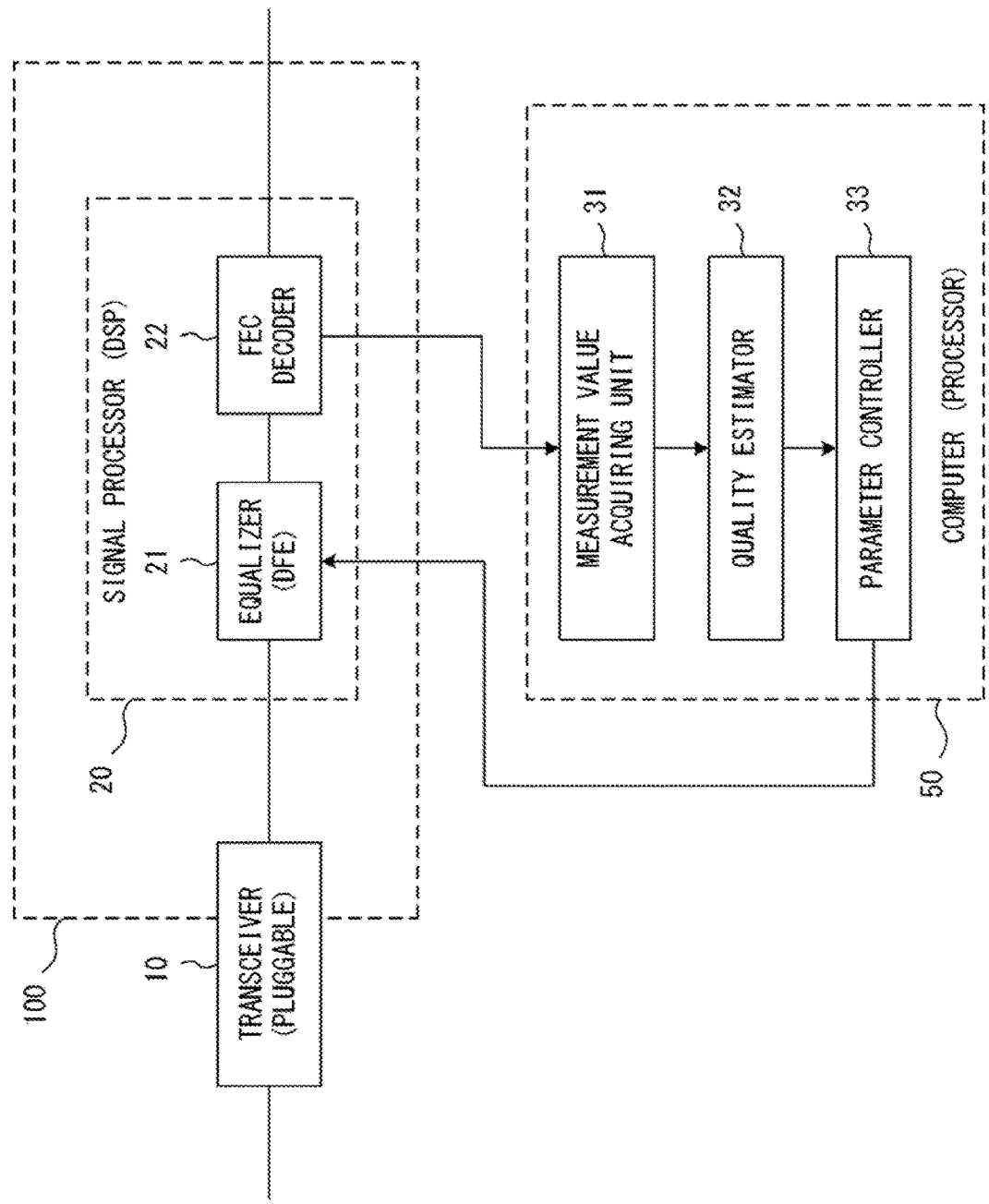
FIG. 15 illustrates another variation of embodiments of the present invention.

FIG. 15 illustrates another variation of embodiments of the present invention. In the example depicted in FIG. 15, a computer 50 is connected to the communication device 100. The computer 50 includes a processor and a memory. The processor provides the functions of the measurement value acquiring unit 31, the quality estimator 32, and the parameter controller 33 by executing a software program stored in the memory. The computer 50 does not need to be a dedicated computer for estimating a post-FEC BER but may provide other functions.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present inventions have been described in detail, it should be understood that the various changes, substitutions, and alterations could be made hereto without departing from the spirit and scope of the invention.

What is claimed is:

1. A communication quality estimating device for estimating an error rate of an error-corrected signal that is obtained after an error correction using an error correction code capable of correcting K errors is performed, the communication quality estimating device comprising:
a processor configured to
obtain a frequency measurement value that indicates a frequency at which a codeword including m errors is received,
determine a transition probability and a continuation probability included in each of a plurality of formulae, such that a frequency calculation value that is calculated using the plurality of formulae and indicates a frequency at which a codeword including m errors is received is brought close to the frequency measurement value, the transition probability being a probability that a normal state transitions to an error state, the continuation probability being a probability that the error state continues,
calculate a frequency at which a codeword including more than K errors is received, by using the plurality of formulae each with the determined transition probability and the determined continuation probability, and
estimate the error rate of the error-corrected signal based on a result of the calculation.

2. The communication quality estimating device according to claim 1, wherein the plurality of formulae indicate transitions between one normal state and a plurality of error states and include probabilities that the one normal state transitions to each of the error states and continuation probabilities that each of the error states continues.

3. The communication quality estimating device according to claim 1, wherein for each of the formulae, the frequency at which a codeword including m errors is received is calculated by multiplying a frequency at which a codeword including m−1 errors is received by the continuation probability.

4. The communication quality estimating device according to claim 3, wherein in each of the formulae, the transition probability indicates a frequency at which a codeword including one error is received.

5. The communication quality estimating device according to claim 1, wherein when a change in a temperature of a decoder that decodes a received signal exceeds a specified threshold, the processor estimates the error rate of the error-corrected signal.

6. A communication device for receiving a signal that is transmitted using an error correction code capable of correcting K errors, the communication device comprising:
a decoder configured to decode the received signal by using the error correction code to output an error-corrected signal; and
a processor configured to
obtain, based on a number of errors corrected by the decoder, a frequency measurement value that indicates a frequency at which a codeword including m errors is received,
determine a transition probability and a continuation probability included in each of a plurality of formulae, such that a frequency calculation value that is calculated using the plurality of formulae and indicates a frequency at which a codeword including m errors is received is brought close to the frequency measurement value, the transition probability being a probability that a normal state transitions to an error state, the continuation probability being a probability that the error state continues,
calculate a frequency at which a codeword including more than K errors is received, by using the plurality of formulae each with the determined transition probability and the determined continuation probability, and
estimate the error rate of the error-corrected signal based on a result of the calculation.

7. The communication device according to claim 6, further comprising:
an equalizer configured to equalize the received signal and provide the equalized signal as an input to the decoder, wherein
the processor controls a parameter indicating an operation of the equalizer based on the estimated error rate.

8. A communication quality estimating method for estimating an error rate of an error-corrected signal that is obtained after an error correction using an error correction code capable of correcting K errors is performed, the communication quality estimating method comprising:
obtaining a frequency measurement value that indicates a frequency at which a codeword including m errors is received;
determining a transition probability and a continuation probability included in each of a plurality of formulae, such that a frequency calculation value that is calculated using the plurality of formulae and indicates a frequency at which a codeword including m errors is received is brought close to the frequency measurement value, the transition probability being a probability that a normal state transitions to an error state, the continuation probability being a probability that the error state continues;
calculating a frequency at which a codeword including more than K errors is received, by using the plurality of formulae each with the determined transition probability and the determined continuation probability; and
estimating the error rate of the error-corrected signal based on a result of the calculation.

* * * * *